United States Patent [19]

Harkness

[11] Patent Number: 4,775,567

[45] Date of Patent: Oct. 4, 1988

[54] WATERPROOFING LAMINATE

[75] Inventor: Alex W. Harkness, Gibsonia, Pa.

[73] Assignee: Hyload Corporation, Pittsburgh, Pa.

[21] Appl. No.: 922,664

[22] Filed: Oct. 24, 1986

[51] Int. Cl.$^4$ .................. B32B 11/04; C08L 95/00
[52] U.S. Cl. .................... 428/40; 52/169.14; 428/351; 428/489
[58] Field of Search .............. 428/40, 489, 351; 52/169.14; 524/66

[56] References Cited

U.S. PATENT DOCUMENTS

| 3,741,856 | 6/1973 | Hurst | 428/489 X |
| 4,039,706 | 8/1977 | Tajima et al. | 428/40 |
| 4,055,453 | 10/1977 | Tajima et al. | 156/279 |
| 4,091,135 | 5/1978 | Tajima et al. | 428/40 |
| 4,442,148 | 4/1984 | Stierli | 428/148 X |
| 4,458,043 | 7/1984 | Evans et al. | 524/66 |
| 4,585,682 | 4/1986 | Colarusso et al. | 428/57 |
| 4,654,385 | 3/1987 | Roberts et al. | 428/351 X |
| 4,735,838 | 4/1988 | Roberts et al. | 428/40 |

FOREIGN PATENT DOCUMENTS 964415 7/1964 United Kingdom ............... 428/517

Primary Examiner—Henry F. Epstein
Attorney, Agent, or Firm—Arnold B. Silverman

[57] ABSTRACT

A waterproofing laminate suitable for use in roofs, floors, or other surfaces where waterproofing is desired, comprises an elastomeric sheet secured to a modified bitumen layer and a release sheet secured to the modified bitumen layer. Certain preferred materials for use in the laminate are recited.

6 Claims, 1 Drawing Sheet

U.S. Patent     Oct. 4, 1988     4,775,567
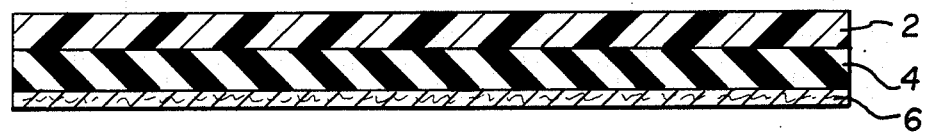

WATERPROOFING LAMINATE

BACKGROUND OF THE INVENTION

1. Field Of The Invention

This invention relates to an improved waterproofing laminate and, more specifically, it relates to such laminates which are particularly useful in connection with waterproofing of building surfaces such as roofs, floors, and other surfaces wherein it is desired to resist penetration of water or water vapor.

2. Description Of The Prior Art

It has been known to employ in various roofing systems built-up roofing. Such systems may include a layer of bituminous roofing felt, a bitumen layer coated on one or both surfaces of the felt, and a material such as gravel, sand, or the like, which is deposited on an exposed bitumen layer. Among the problems found in such systems is that they require extensive field labor, tend to lack uniformity in respect of structural nature and effectiveness from zone to zone and may not perform effectively under a wide variety of climatic conditions.

It has also been known to employ elastomeric waterproof sheeting which has been applied to a substrate such as a roof substrate using molten bitumen or cold applied bituminous adhesives. Among the problems with such approaches is the failure of the elastomeric waterproof sheeting to maintain dimensional stability and avoid wrinkling when bonded with hot bitumen. Also, depending upon the conditions at the time of application, the adhesive bond can substantially vary in effectiveness. On slopes greater than about 10 degrees it is generally necessary to employ mechanical fasteners to secure the membrane in place. Such membranes must generally be left exposed for periods in excess of about 30 days before painting in order to permit the adhesive to cure completely. Such adhesively secured elastomeric waterproof sheetings also can generally not be applied directly to insulation, wood, metal, concrete, and other materials. Also, in warm weather the temperature of the roof can reach such a level that the adhesive liquifies.

It has been known to provide laminated roofing membranes which contain bitumen coated layers and compound bitumen coated layers. See U.S. Pat. Nos. 4,055,453 and 4,091,135, the disclosures of which are expressly incorporated herein by reference.

It has been known to provide waterproofing membranes comprising bituminous materials and containing elastomers, natural or synthetic rubbers, natural or synthetic resins, or a combination of elastomers, resins or rubber.

It has been known to provide waterproofing membranes comprising elastomeric materials which are mechanically fastened, ballasted, or adhered using a contact adhesive applied at the site of used.

It has been known that elastomeric materials such as thermoplastics, natural rubber, synthetic rubber, and bituminous materials tend to be incompatible and that bituminous materials will tend to attack and degrade elastomeric materials.

There remains, therefore, a very real and substantial need for a waterproofing laminate which combines the desirable characteristics of both the modified bitumen materials and elastomeric materials and which can be installed without the need of a site applied adhesive, mechanical fasteners, or ballast and which will provide effective, dependable waterproofing to a roof, floor, below grade installation or other installation making waterproofing characteristics desirable as necessary.

SUMMARY OF THE INVENTION

The present invention has solved the previously described problem. A waterproofing laminate comprises an elastomeric sheet, a modified bitumen layer, and a release sheet. The elastomeric sheet is secured to the modified bitumen layer. The modified bitumen adhesive is secured, prior to installation, to a release sheet. Removal of the release sheet permits the waterproofing laminate to be secured to the surface to be protected.

It is an object of the present invention to provide an improved waterproofing laminate which will resist undesired penetration of water and water vapor therethrough.

It is another object of the present invention to provide a waterproofing laminate which will resist shrinking and wrinkling during application and following application.

It is a further object of the present invention to provide an assembly wherein factory labor is substituted to a major extent for field labor.

It is a further object of the invention to provide an assembly wherein securement of the waterproofing laminate will not alter the effectiveness as a result of the climatic conditions under which the installation is made.

It is a further object of the present invention to provide such an assembly which can be secured directly to a wide variety of materials, can be painted promptly after installation and need not be secured by mechanical fasteners on installations which slope.

It is yet another object of the present invention to provide a laminated waterproofing membrane which will resist deterioration under the influence of a wide variety of chemical elements, will have tensile and elongation properties such that wide variations in temperature and physical movement of building components will not destroy its effectiveness.

These and other objects of the invention will be more fully understood from the following description of the invention on reference to the illustration appended hereto.

BRIEF DESCRIPTION OF THE DRAWING

The drawing is a somewhat schematic cross-sectional illustration of a laminate of the present invention.

DESCRIPTION OF THE PREFERRED EMBODIMENT

As shown in the FIGURE, the elastomeric sheet 2 has a modified bitumen layer 4 secured to one surface. The release sheet 6 is secured to the other surface of the modified bitumen layer 4. It is contemplated that the elastomeric sheet 2 will be exposed to the elements when the laminate is secured to a roof, floor, or other building component. Application to th surface is made by removing release sheet 6, thereby exposing modified bitumen layer 4 which may then serve as an adhesive to bond the laminate to the surface to be protected.

The elastomeric sheet 2 preferably has certain characteristics including properties which resist bitumen attack. A suitable sheet for this purpose is that disclosed in U.S. Pat. No. 4,458,043, the disclosure of which is expressly incorporated herein by reference.

In general, it will be preferred that the elastomeric sheet 2 contain at least one material selected from the group consisting of ethylenepropylene diene monomer, polyisobutylene, chlorinated polyethylene, natural rubber, polyvinyl chloride, ethylene vinyl acetate, coal tar pitch, and chlorosulfonated polyethylene. A specifically preferred formulation for the elastomeric sheet 2 includes about 10 to 40 percent by weight of unplasticized polyvinyl chloride, about 10 to 40 percent by weight of an ethylene vinyl acetate carbon monoxide terpolymer and about 5 to 35 percent by weight of coal tar pitch. The elastomeric sheet may also contain up to about 15 percent of primary or secondary plasticizer with, or without, up to about 10 percent of processing aids or stabilizers.

The amount of polyvinyl chloride is preferably in the range of about 20 to 30 percent by weight of the entire composition and may advantageously be provided as a suspension or emulsion grade of polyvinyl chloride. The ethylene vinyl acetate carbon monoxide terpolymer may contain about 15 to 85 percent ethylene, about 5 to 60 percent vinyl acetate, and about 0.5 to 30 percent carbon monoxide, all on a weight basis. A suitable terpolymer for use in this context is that marketed by du Pont de Nemours E. I. & Company under the trade designation "Elvaloy", with the preference being for "Elvaloy 742".

With respect to the coal tar pitch constituent, it may be provided as such or in admixture with bitumen of natural or synthetic origin such as an unmodified or modified bitumen from the primary or secondary refining of petroleum. Any bitumen present in the coal tar pitch is preferably present in an amount of less than about 30 percent by weight of the pitch/bitumen mixture. The pitch preferably has a softening point (as determined by the ring and ball method) in the range of about 80° C. to 150° C., and preferably around 105° C. It may preferably be that known as "electrode pitch". Electrode pitch is a product of Allied Chemical Corporation, Ashland, Ky. This material is used primarily as an extender. However, it also provides resistance to bacterial and biological attack.

The elastomeric sheet 2 preferably contains particulate and fibrous fillers. Among the suitable particulate fillers are reinforcing fillers such as carbon black, silica, zinc oxide, phenolic resin, magnesium carbonate, wool, polyester, cotton, nylon, and mixtures thereof. Among the nonreinforcing fillers, those preferred are calcium carbonate (whiting), barium sulfate, hydrated aluminum silicate, china clay, and magnesium silicate. The total amount of particulate filler is preferably up to about 30 percent weight percent, based upon total composition, with a specific preference being for up to about 20 percent weight percent. Preferred fibrous fillers are natural fibers including inorganic or mineral fibers, wool and cotton; the fibers may be presented as monofilament or yarn. Also, synthetic fibers, for example, nylon and polyester provided as monofilament or yarn. The fibrous fillers may conveniently be comminuted waste conveyor belting or other suitable waste fiber, if desired.

A suitable plasticizer for use in the polyvinyl chloride is preferably incorporated in the elastomeric sheet 2. It may be, for example, a phthalate ester, an ester of sebacic acid or adipic acid, a phosphate ester, or oxidized soya bean oil. The plasticizer is preferably present in an amount of not more than about 8 percent by weight of the total composition.

Among the processing aids preferably employed are well known internal and external lubricants which have conventionally been employed in connection with polyvinyl chloride compounding. Examples of lubricants are stearic acid, fatty acid salts, zinc stearate, lead stearate, mixtures thereof and the like. The composition is preferably provided with an amount of stabilizer to prevent degradation of the polyvinyl chloride or ethylene vinyl acetate carbon monoxide terpolymer during high temperature processing. Suitable stabilizers are basic lead carbonate, barium sulfate, cadmium sulfate, mixtures thereof and the like. The selection and quantity of such stabilizers are well known to those skilled in the art.

In making the material for use in elastomeric sheet 2, the materials may be processed by mixing in a compounding roll mill such as a Buss Ko Kneader or a Banbury type mixer and may be converted to sheet form by calendering or extrusion.

Modified bitumen layer 4 may comprise a bitumen compounded with natural and/or synthetic rubbers, or a bitumen compounded with elastomeric materials. The compounding materials should be selected so as to effect a denaturing and enhancement of properties of the bitumen, particularly in respect of temperature susceptibility. With respect to rubber, the preferred materials for use for this purpose are vulcanized or nonvulcanized rubber composed of various types of synthetic rubber such as styrene-butadiene rubber, acrylonitrile-butadiene rubber, chloroprene rubber, butadiene rubber, isoprene rubber, butyl rubber, ethylene-propylene rubber, ethylene-propylene diene mar, polyisobutylene, chlorinated polyethylene, atactic polypropylene, and natural rubber. Among the natural or synthetic resins preferred for this purpose are rosin, rosin derivatives such as estergum, tall oil, cumarone-indene resin, petroleum resins, and polyolefin such as polybutene. It is preferred that the total amount of rubber, resin, or combinations of both present in the modified bitumen layer 4 be about 15 to 50 percent by weight. It is preferred that modified bitumen layer 4 be a coating.

If desired, these rubber and resin compounding materials may be partially substituted by animal or vegetable oils and fats, as these oils and fats also are effective for increasing the tackiness of the bitumen. Among the oils and fats which are suitable for this purpose are animal oils and fats such as fish oil, whale oil, beef tallow, and the like as well as vegetable oils such as linseed oil, tung oil, sesame oil, cottonseed oil, soya bean oil, olive oil, castor oil, and the like. They also may include materials such as stand oil, oxidized oil, and boiled oil made therefrom, as well as fatty acid pitch and the like. The quantity of these oils and fats is preferably less than about 50 percent by weight of the total quantity of rubber and/or resin and oils and fats added.

Also, if desired, a softener such as petroleum oil, or a filler such as mica powder can be incorporated into modified bitumen layer 4. In general, it will be preferred to have the thicknesses of elastomeric layer 2 and modified bitumen layer 4 to be generally equal. Elastomeric layer 2 is preferably of a thickness of about 0.03 inches. Modified bitumen layer 4 is preferably about 0.03 to 0.04 inches thick.

Release sheet 6 is secured to one surface of modified bitumen layer 4 in order to protect it from inadvertent contact with surfaces other than the surface sought to be protected. Release sheet 6 is secured to the surface of modified bitumen layer 4 opposite the surface of modified bitumen layer 4 secured to elastomeric layer 2. The release sheet 6 may advantageously be composed of cellophane, polyvinyl alcohol film, or aluminum foil. It may also take the form of a treated sheet, such as film, foil, paper, and the like, subjected to surface treatment as by coating, or impregnated with synthetic resins having a high releasing property such as silicone resin, fluorine-containing resin, and polyvinylidine chloride.

EXAMPLE

In order to provide a further understanding of the invention, an example will be considered.

The components listed below were compounded, except pitch and whiting, in an unheated Banbury mixed for about 5 minutes. When the mixture reaches a predetermined temperature the pitch is added, followed by the whiting. The total mixture is then mixed to a further predetermined temperature. This was followed by mixing in of the pitch and whiting for about 2 minutes. The resulting composition was calendered into an elastomeric sheet of about 0.03 inch thickness and about 38 inches in width. All percentages are weight percentages based on the total weight of the elastomeric sheet.

| ELASTOMERIC SHEET COMPONENT | % RANGE |
| --- | --- |
| PVC "Scon 5410" (a product of Stavely Chemical) | 10-40 |
| Ethylene Vinyl Acetate Carbon Monoxide Terpolymer "Elvaloy 742" (a product of du Pont de Nemours E. I. & Company) | 10-40 |
| Fiber-comminuted "Dunlop" Conveyor Belting | 4-12 |
| Plasticizer "Cereclor 45", A Chlorinated Paraffin Containing 45% Chlorine (a product of ICI) | 2-10 |
| Lubricant: Stearic Acid | 1-2 |
| Stabilizer: Basic Lead Carbonate | 1-2 |
| Electrode Pitch (105° C. Ring & Ball) | 5-35 |
| Filler: Whiting | 0-20 |
| PVC "Geon" (a product of Goodrich) | 26% |
| Ethylene Vinyl Acetate Carbon Monoxide Terpolymer "Elvaloy 742" (a product of du Pont de Nemours E. E. & Company) | 28% |
| Fiber-comminuted "Dunlop" Conveyor Belting | 8% |
| Plasticizer "Cereclor 45", A Chlorinated Paraffin Containing 45% Chlorine (a product of ICI) | 3% |
| Lubricant: Stearic Acid | 1% |
| Stabilizer: Basic Lead Carbonate | 1% |
| Electrode Pitch (105° C. Ring & Ball) | 20% |
| Filler: Whiting | 13% |

The properties of the resultant elastomeric sheet disclosed above are as follows:

| | | Test |
| --- | --- | --- |
| Tensile Strength | 750 lb./in² | ASTM D412 |
| Elongation | 170% | ASTM D412 |
| Tear Strength | 165 ppi | ASTM D412 |
| Dimensional Stability at 80° C. | −1% | |

The elastomeric sheet is coated on a continuous roller with a molten modified bitumen containing about 20% by weight of rubber and/or resins such as styrene butyl diene styrene and is maintained at about 200° C. The thickness of the coating is in the preferred range of 0.03 inches to 0.04 inches. The release sheet composed of grease proofed paper is applied to the surface of the modified bitumen layer. The resulting laminate is trimmed along the edges to remove surplus elastomeric sheet.

In general, it will be preferred that the modified bitumen layer be applied as a continuous layer to the respective surface in order to provide a uniform laminate.

In applying the laminate to a roof, floor, or other structure one need merely remove release sheet 6, thereby exposing modified bitumen layer 4, permitting modified bitumen layer 4 to be applied in surface-to-surface contact with the surface to be protected. With the application of slight pressure, the installation is complete.

It will be appreciated that the laminate of the present invention provides an effective means for substituting factory labor for field labor in producing a product of desirable uniform characteristics, eliminating the numerous undesirable aspects of the prior art products and methods as discussed hereinbefore.

Whereas particular embodiments of the invention have been described above for purposes of illustration, it will be evident to those skilled in the art that numerous variations of the details may be made without departing from the invention as defined in the appended claims.

I claim:

1. A waterproof laminate comprising:
   an elastomeric sheet;
   said elastomeric sheet comprising about 10 to 40 percent by weight of unplasticized polyvinyl chloride; about 10 to 40 percent by weight of ethylene vinyl acetate carbon monoxide terpolymer; about 5 to 35 percent by weight of coal tar pitch; the remainder being particulate filler, fibrous filler, plasticizer, processing aids and stabilizers;
   a modified bitumen layer secured to said elastomeric sheet;
   said modified bitumen layer containing a material selected from the group consisting of natural rubber, synthetic rubber, natural resin, and synthetic resin; and
   a release sheet secured to said modified bitumen layer, whereby the removal of said release sheet will permit securement of said waterproofing laminate to a surface by application of pressure to said elastomeric sheet-modified bitumen layer.

2. The waterproofing laminate of claim 1, including said release sheet consisting of a material selected from the group consisting of film, foil, and paper.

3. The waterproofing laminate of claim 2, including said release sheet consisting of a material selected from the group consisting of cellophane, polyvinyl alcohol film, and aluminum foil.

4. The waterproofing laminate of claim 1, including said modified bitumen layer containing about 15 to 50 percent by weight of said natural rubber, said synthetic rubber, said natural resin, said synthetic resin and mixtures thereof.

5. The waterproofing laminate of claim 4, including said modified bitumen layer being substantially continuous.

6. The waterproofing laminate of claim 5, including the said modified bitumen layer being a coating.

* * * * *